No. 672,004. Patented Apr. 16, 1901.
J. T. McROY.
BUILDING BLOCK.
(Application filed Oct. 17, 1900.)
(No Model.) 2 Sheets—Sheet 1.
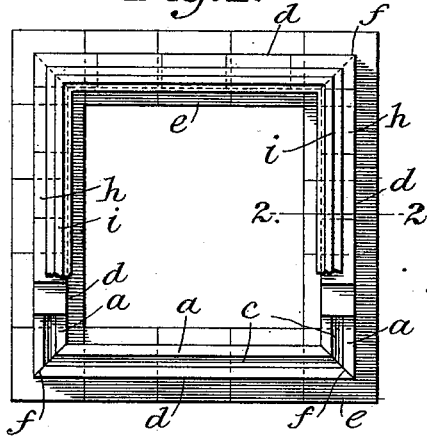
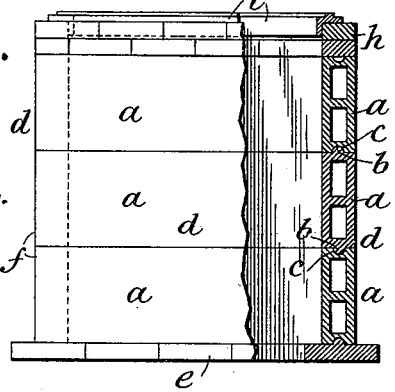
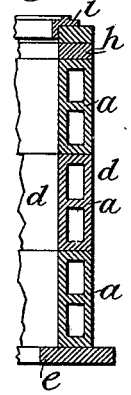
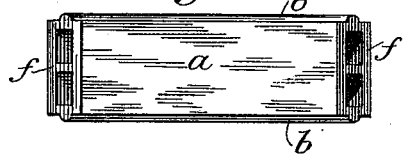
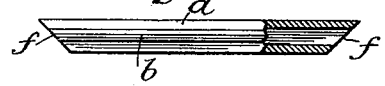
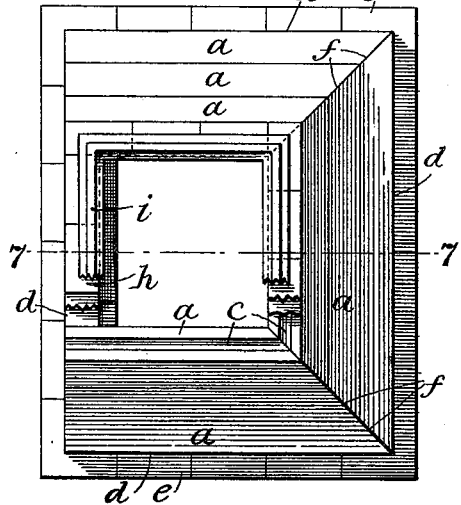
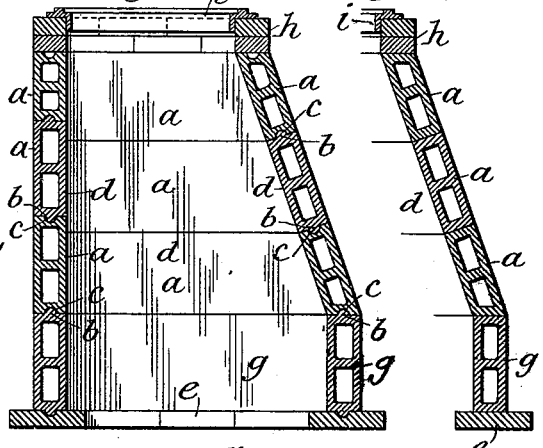
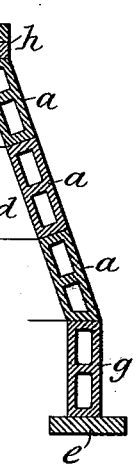
Attest:
A. N. Jesbera.
J. M. Scoble.
Inventor:
John T. McRoy.
by Redding, Kidd & Greeley,
Attys.

No. 672,004. Patented Apr. 16, 1901.
J. T. McROY.
BUILDING BLOCK.
(Application filed Oct. 17, 1900.)
(No Model.) 2 Sheets—Sheet 2.

Attest:
A. N. Jesbera
J. M. Scoble.

Inventor:
John T. McRoy.
by Redding, Kiddle & Greeley,
Attys.

UNITED STATES PATENT OFFICE.

JOHN T. McROY, OF NEW YORK, N. Y.

BUILDING-BLOCK.

SPECIFICATION forming part of Letters Patent No. 672,004, dated April 16, 1901.

Application filed October 17, 1900. Serial No. 33,338. (No model.)

*To all whom it may concern:*

Be it known that I, JOHN T. McROY, a citizen of the United States of America, residing in the borough of Manhattan, city of New York, in the State of New York, have invented certain new and useful Improvements in Building-Blocks, of which the following is a specification.

Figure 11:
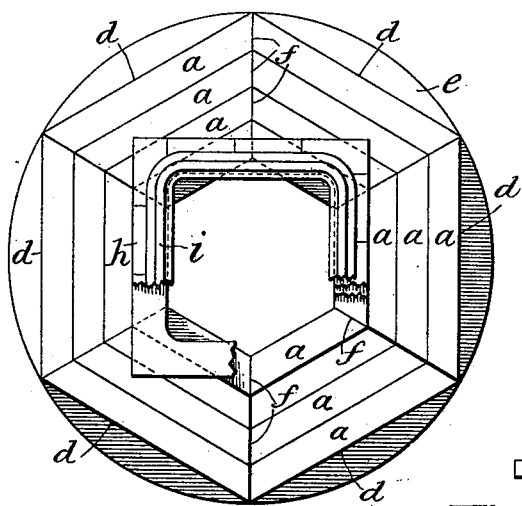
Figure 12:
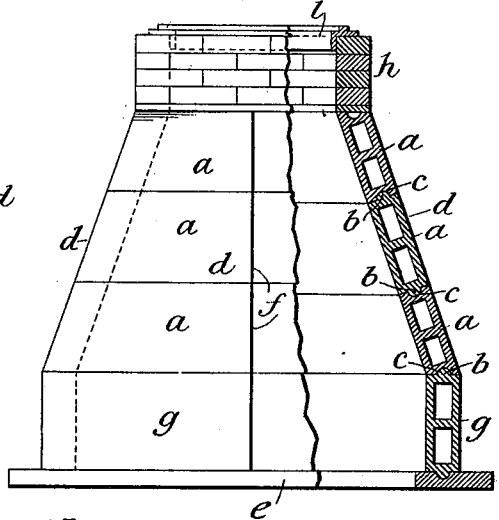
Figure 15:
Figures 13, 14:
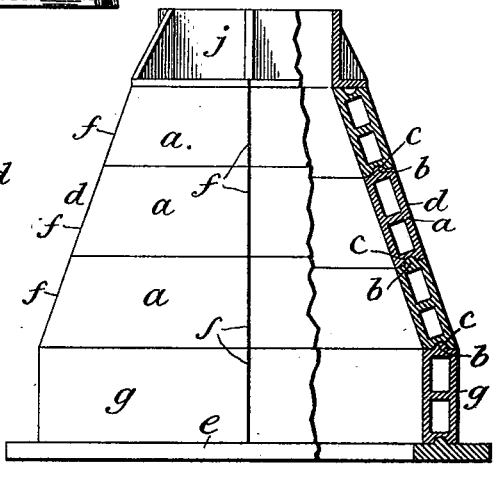

In the accompanying drawings, Figure 1 represents a plan view of a square structure built of the improved blocks, showing the capping broken away in part to more clearly disclose the construction. Fig. 2 represents a side elevation of the same, partly in section, on the lines 2 2 of Fig. 1. Fig. 3 is a detail view showing another form of the building-blocks as used in a structure provided with perpendicular walls. Fig. 4 represents a side elevation of one of the building-blocks. Fig. 5 is a top or plan view of the same. Fig. 6 is a plan view of a structure having three of its sides inclined or sloping, the capping being broken away in part to disclose the construction. Fig. 7 represents a vertical central section of the same on the line 7 7 of Fig. 6. Fig. 8 is a detail view showing an inclined wall built of blocks without the tongue and groove. Fig. 9 represents a side elevation of a block adapted for use in building an inclined wall. Fig. 10 is a top or plan view of the same. Fig. 11 is a plan view of a hexagonal structure having sloping sides built of the improved blocks, the capping being partly broken away. Fig. 12 represents a side elevation of the same, partly in section. Fig. 13 represents a hexagonal structure provided with a solid capping. Fig. 14 represents a side elevation of the same, partly in section. Fig. 15 is a side elevation of one of the blocks provided with a tongue and a groove.

The blocks $a$ are preferably hollow and are beveled at their ends according to the shape or configuration of the building to be erected. Each block is provided with a tongue $b$ or a groove $c$ on its top and bottom, so that the tongues upon the blocks forming one course or layer of the building will engage in and interlock with the grooves in the blocks forming the adjacent course or layer. If preferred, the blocks may be formed with a tongue on one side and a corresponding groove on the opposite side. In the case of a structure having inclined or sloping walls the ends of the blocks are provided with a bevel oblique to all the faces of the blocks, as shown in Figs. 9 and 10, so that the walls may converge toward their tops. The angles of the bevels are determined by the configuration of the building and the degree of inclination or convergence of the wall.

The blocks can be used in the construction of a building having any preferred shape. In the drawings the same are shown as used in the construction of a square and hexagonal structure having perpendicular and sloping walls. In the square structure (shown in Figs. 1 to 3, inclusive) the walls $d$ are perpendicular and rest upon a suitable base $e$. The ends $f$ of the blocks are beveled at an angle of forty-five degrees, where they abut in the same course or layer to form the angles of the walls. In the case of hexagonal structures, however, it is obvious that the ends of the blocks must be beveled at an angle of sixty degrees and that this angle may be varied according to the number of walls in the building and the angle in which the walls abut. In the case of a structure either square or hexagonal having inclined or sloping walls the blocks are cut upon a bevel oblique to all the faces of the blocks to provide for the convergence of the walls toward their tops and for the angle of the walls. The walls may be inclined from the base-block upward, or a suitable riser $g$ may be used, if desired. The top of the structure may be made in any preferred way, according to the use to which the same is to be put. If used in the construction of a manhole for underground passages, a capping $h$, formed of ordinary bricks, with a top plate $i$, may be used, or a capping $j$, formed of a single piece of metal, as shown in Figs. 13 and 14.

The invention is particularly adapted for use in structures that it is necessary or desirable to build rapidly. The blocks are manufactured with suitable bevels, according to the shape or configuration of the structure, so that it can be built up without requiring the employment of skilled labor. The interlocking tongue and groove, in connection with the beveled ends, provide perfect alinement and insure that the structure will be of the desired shape. The tongue and groove also tend to strength and reinforce the wall and increase its rigidity and ability to withstand strain. Preferably the blocks are made of sufficient length to extend the entire length of the wall, particularly in small structures; but two or more blocks may be used to form each course, providing the ends of each course are suitably beveled.

Although the blocks have been shown in the construction of manholes, it is obvious that they can be used in any kind of structure or building where ordinary bricks or terra-cotta is now employed.

I claim as my invention—

1. A building-block having its ends beveled in a plane oblique to all the faces of the block and provided on opposite sides with a tongue or recess, substantially as described.

2. A building-block for converging walls arranged at an angle to each other, said blocks having their abutting ends beveled to form the angles of said walls, said ends being inclined or sloping in a plane transverse to the plane of said bevel to permit said walls to converge toward their tops, substantially as described.

3. A building-block for converging walls arranged at an angle to each other, said blocks having their abutting ends beveled to form the corners of said walls, said ends being also beveled in a plane transverse to the plane of the first bevel to permit the walls to converge toward their tops, the blocks forming each course in said walls being provided with a tongue engaging in a corresponding groove formed in the adjacent course, substantially as described.

In testimony whereof I sign this application, in the presence of two witnesses, this 11th day of October, 1900.

JOHN T. McROY.

Witnesses:
ROSWELL S. NICHOLS,
A. N. JESBERA.